United States Patent

Dezonno

[19]

[11] Patent Number: 5,923,729
[45] Date of Patent: Jul. 13, 1999

[54] AUTOMATIC TONE FAULT DETECTION SYSTEM AND METHOD

[75] Inventor: Anthony Dezonno, Chicago, Ill.

[73] Assignee: Rockwell Semiconductor Systems, Inc., Newport Beach, Calif.

[21] Appl. No.: 08/859,246

[22] Filed: May 20, 1997

[51] Int. Cl.⁶ .............................. H04M 1/24; H04M 3/08; H04M 3/22

[52] U.S. Cl. .................................. 379/1; 379/10; 379/15; 379/16

[58] Field of Search ............................... 379/1, 9, 10, 12, 379/15, 17, 23, 26, 27, 29, 31, 34

[56] References Cited

U.S. PATENT DOCUMENTS

| | | | |
|---|---|---|---|
| 4,972,453 | 11/1990 | Daniel, III et al. | 379/10 |
| 5,127,004 | 6/1992 | Lenihan et al. | 379/418 |
| 5,384,822 | 1/1995 | Brown et al. | 379/10 |
| 5,504,801 | 4/1996 | Moser et al. | 379/29 |
| 5,526,416 | 6/1996 | Dezonno et al. | 379/265 |
| 5,572,570 | 11/1996 | Kuenzig | 379/1 |
| 5,633,909 | 5/1997 | Fitch | 379/15 |
| 5,790,634 | 8/1998 | Kinser, Jr. et al. | 379/29 |
| 5,832,058 | 11/1998 | Walance et al. | 379/22 |
| 5,835,565 | 11/1998 | Smith et al. | 379/5 |
| 5,838,766 | 11/1998 | Rand | 379/9 |
| 5,850,426 | 12/1998 | Watkins et al. | 379/29 |
| 5,852,649 | 12/1998 | Hodson | 379/9 |

*Primary Examiner*—Curtis A. Kuntz
*Assistant Examiner*—Binh K. Tieu
*Attorney, Agent, or Firm*—Welsh & Katz, Ltd.

[57] ABSTRACT

A tone fault detection system is coupled to a telephonic system, such as an automatic call distributor (ACD) via an ISDN communication link. The ACD includes a multiport switch with a plurality of ports on which tones and messages are provided, and a basic rate line interface device coupled to the multiport switch for communicating with the tone fault detection apparatus. The tone fault detection system includes a telephonic adapter configured to communicate with the ACD and a central processor coupled to the telephonic adapter where the central processor is configured to send and receive data signals and control signals. Also included is an audio detection circuit coupled to the telephonic adapter to receive signals representative of the tones and messages provided by a selected port of the ACD, where the audio detection circuit is configured to measure a power level of the received signal and to provide an indication to the central processor whether the measured power level is within a predetermined range. An alarm circuit coupled to the central processor is configured to indicate to the ACD that the measured power level is not within the predetermined range.

34 Claims, 4 Drawing Sheets

AUTOMATIC TONE FAULT DETECTION SYSTEM AND METHOD

BACKGROUND OF THE INVENTION

The present invention relates generally to automatic tone failure detection in a telecommunication system and more specifically to a system to automatically detect tone and message failures in a telephonic system, such as an automatic call distributor system.

Telecommunication systems employing an automatic call distributor having a multiport switch controlled by a central processing unit in conjunction with a main memory for selectively interconnecting telephone calls received from external telephonic units of an external telephonic switching network, are well known. Examples of such automatic call distributors are shown in U.S. Pat. No. 5,127,004 issued to Lenihan et al. on Jun. 30, 1992, entitled Tone and Announcement Message Code Generator for a Telephonic Switching System and Method and U.S. Pat. No. 5,140,611 issued to Jones et al. on Aug. 18, 1992, entitled Pulse Width Modulated Self-Clocking and Self-Synchronizing Data Transmission and Method for a Telephonic Communication Network Switching System. Telecommunication systems are also known to include ISDN (Integrated Services Digital Network) interfaces for connection to ISDN telephonic units and are shown in U.S. Pat. No. 5,526,416 issued to Dezonno et al. on June 11, entitled Automatic Call Distribution System with an ISDN Compatible Call Connection System and Method.

Automatic call distributor (ACD) systems are typically used in business establishments to connect a plurality of external telephonic units, typically associated with customer calls, to a plurality of internal telephonic units, typically associated with agents who service the customers. The ACD provides individual telephonic units with information in the form of tones and messages. Tones are single, multiple, or alternating frequencies, and are continuous or intermittent. Familiar examples of such tones include the busy tone, ring back tone, dial tone, and touch tones. The messages or announcements are voice communications such as "your call cannot be completed," and "calls are now being taken at the number . . ." These tones and messages are stored in the ACD and are provided, as required, to the customer whose call is routed from an external telephonic network to the ACD.

Hardware and software failures have been known to occur in ACD systems that adversely affect the production of tones and messages. Typical ACD systems digitally store the tones and messages in memory and "map" the tones and messages to particular channels on a time multiplexed basis. Corruption of memory locations and software "bugs" may cause a failure in the production of tones and messages. Failures may also occur in the circuits that generate the tones and announcements, and such circuits are referred to as DAS circuits (Digital Audio Source). When a failure occurs, the customer calling the ACD from an external telephonic unit recognizes that the call has been answered, but cannot hear anything further. The customer is said to experience "dead-air time." This is very disconcerting and frustrating to the customer, who often disconnects the call. If proper connection cannot be established by redialing the telephone number once more, the customer may chose not to redial the business establishment, resulting in potential loss of business. Other types of failures may result in tones and messages that are not sufficiently loud causing the customer to experience difficulty in hearing the tones or message. When such failures occur, it may be difficult or impossible for the customer to recognize the content or meaning of the message. Similarly, business opportunities may be lost.

Known ACD systems do not have any way to automatically detect when failures occur with respect to the generation of tones and messages. Typically, the agent is eventually notified by a customer who is finally able to successfully contact the agent through the ACD. The customer may inform the agent that he or she has had difficulty in reaching the agent. Of course, the customer may neglect to inform the agent of the problem, and other callers may experience the same problems. If the customer does inform the agent that a problem was experienced, the agent may then notify a supervisor, a system technician, or other personnel that a failure has occurred. The service personnel must then locate and correct the fault.

Accordingly, it is an object of the present invention to provide a novel method and system to substantially overcome the above-described problems.

It is another object of the present invention to provide a novel tone fault detection system for an ACD system.

It is a further object of the present invention to provide a novel tone fault detection system that automatically detects when tones and messages are not produced or not produced at a sufficient power level.

It is also an object of the present invention to provide a novel tone fault detection system that automatically determines in which port of the ACD the failure has occurred.

It is still an object of the present invention to provide a novel tone fault detection system that provides the ACD system with an alarm indicating that a fault has been detected.

It is yet another object of the present invention to provide a novel tone fault detection system that is separate from the ACD system and connects to the ACD system through a Basic Rate Line interface device.

It is yet a further object of the present invention to provide a novel tone fault detection system that logs into the ACD system and appears to the ACD system as a supervisory console.

SUMMARY OF THE INVENTION

The disadvantages of present tone and message fault detection methods and systems are substantially overcome with the present invention by providing a novel automatic tone fault detection method and apparatus for an automatic call distributor system.

According to one specific embodiment of the present invention, the tone fault detection system is coupled to a telephonic system, such as a automatic call distributor system (ACD), and continuously samples selected ports of the ACD system to determine whether the ports are functioning correctly. The ports that provide tones and messages need only be tested. However, any ports included in a "ports-to-be-monitored" list may be tested. Under software control, the tone fault detection system logs into the ACD system as a supervisory console. As such, the ACD responds to commands issued by the tone fault detection system and routes the output of dedicated tone and message ports through a basic rate line circuit (BRL) and to an ISDN telephonic adapter of the tone fault detection system. An audio detection circuit receives analog audio signals from the telephonic adapter and analyzes the audio waveform to determine whether the amplitude (or power level) of the audio signal is within predetermined limits. The frequency or a frequency range of the audio signals may also be determined by the audio detection circuit.

The test may be continuously performed so that any failure in the ports of the ACD are rapidly detected. Rapid detection permits the technical service personnel to effect repair of the ACD so that the possibility of a customer or caller experiencing difficulty in connecting to the ACD is minimized. Because the tone fault detection system displays the failed port(s) on a monitor, the service personnel may quickly correct the failure without unnecessary trouble shooting to determine which port failed. This reduces maintenance costs.

More specifically, the automatic tone fault detection system of one embodiment of the present invention is coupled to an ACD via an ISDN telephonic adapter. The ACD includes a multiport switch having a plurality of ports on which tones and messages are provided, and a basic rate line interface device coupled to the multiport switch for communicating with the tone fault detection system. The tone fault detection system includes the telephonic adapter configured to communicate with the ACD and a central processor coupled to the telephonic adapter, where the central processor is configured to send and receive data signals and control signals. Also included is an audio detection circuit coupled to the telephonic adapter to receive signals representative of the tones and messages provided by a selected port of the ACD, where the audio detection circuit is configured to measure a power level of the received signal and to provide an indication to the central processor whether the measured power level is within a predetermined range. An alarm circuit coupled to the central processor is configured to indicate to the ACD that the measured power level is not within the predetermined range.

According to another aspect of the present invention, a method for detecting failure of tones and messages generated by an automatic call distributor having a plurality of ports on which the tones and messages are provided, includes the steps of: a) establishing communication with the ACD, b) selecting a port to be tested, c) identifying the selected port to the ACD so that the ACD provides tones or messages on the selected port, d) receiving audio signals representative of the tones or messages, e) measuring a power level of the received audio signals, f) determining if the measured power level is within a predetermined range, and g) notifying the ACD of a failure if the measured power level is not within the predetermined range.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

DETAILED DESCRIPTION

Figure 1:
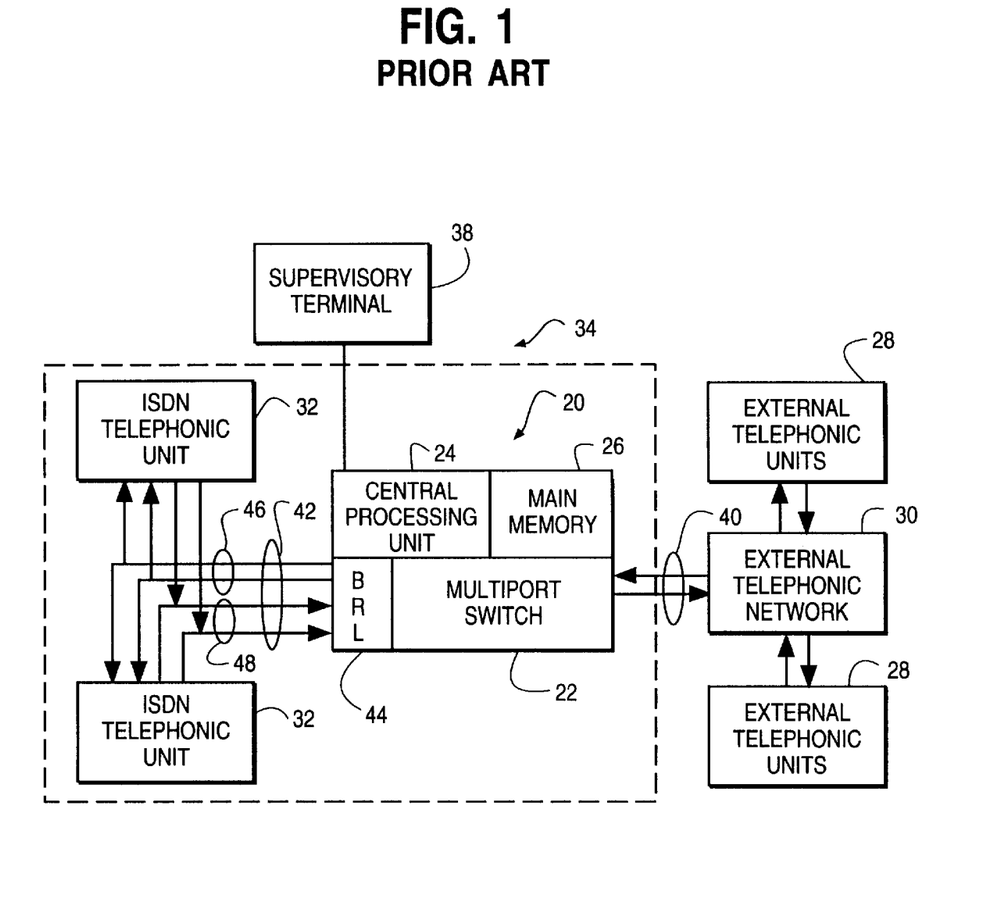
FIG. 1 is a prior art functional block diagram of an ACD system.

Referring now to FIG. 1, a known telephonic system, such as an automatic call distributor (ACD) 20, is shown having a multiport switch 22 controlled by a central processor 24 in conjunction with a main memory 26 for selectively interconnecting a plurality of external telephonic units 28 of an external telephonic network 30 with a plurality of Integrated Services Digital Network (ISDN) based interior telephonic units 32. The automatic call distributor 20 is part of an automatic call distributor system 34, which includes the ISDN telephonic units 32 and a supervisory terminal 38. The multiport switch 22 of the automatic call distributor 20 connects with the external telephonic network 30 over standard telephonic interface lines or trunks 40. The automatic call distributor 20 determines which ISDN telephonic units 32 receive telephonic calls made from the external telephonic units 28 of the external telephonic network 30 and other internal ISDN telephonic units of the automatic call distributor system 34.

The multiport switch 22 of the automatic call distributor 20 connects to the ISDN interior telephonic units 32 over a four wire interface 42 via a basic rate line (BRL) interface 44, which may be, for example, an ISDN "S" type BRL interface. Two of the wires 46 are for the receipt of digitized voice and digital signaling data of a telephonic call received at the ISDN telephonic unit 32, and the two other wires 48 of the four wire interface 42 are for the transmission of voice and data information from the ISDN telephonic unit to the automatic call distributor 20. Multiple ISDN telephonic units may be connected to a single four wire interface line 42 of the BRL interface 44, but only two are shown for purposes of clarity.

An example of a known automatic call distributor system utilizing an ISDN interface is disclosed in U.S. Pat. No. 5,526,416 issued to Dezonno et al. on Jun. 11, 1996 entitled Automatic Call Distribution System with an ISDN Compatible Call Connection System and Method. Other examples of known automatic call distributor systems are shown in U.S. Pat. No. 5,127,004 issued to Lenihan et al. on Jun. 30, 1992, entitled Tone and Announcement Message Code Generator for a Telephonic Switching System and Method, U.S. Pat. No. 5,140,611 issued to Jones et al. on Aug. 18, 1992 entitled Pulse Width Modulated Self-Clocking and Self-Synchronizing Data Transmission and Method for a Telephonic Communication Network Switching System, and U.S. Pat. No. 5,268,903 issued to Jones et al. on Dec. 7, 1993, entitled Multichannel Telephonic Switching Network With Different Signaling Formats and Cross Connect/PBX Treatment Selectable For Each Channel. All of the above-identified patents are owned by the common assignee of this patent/patent application and are hereby incorporated by reference.

Figure 2:
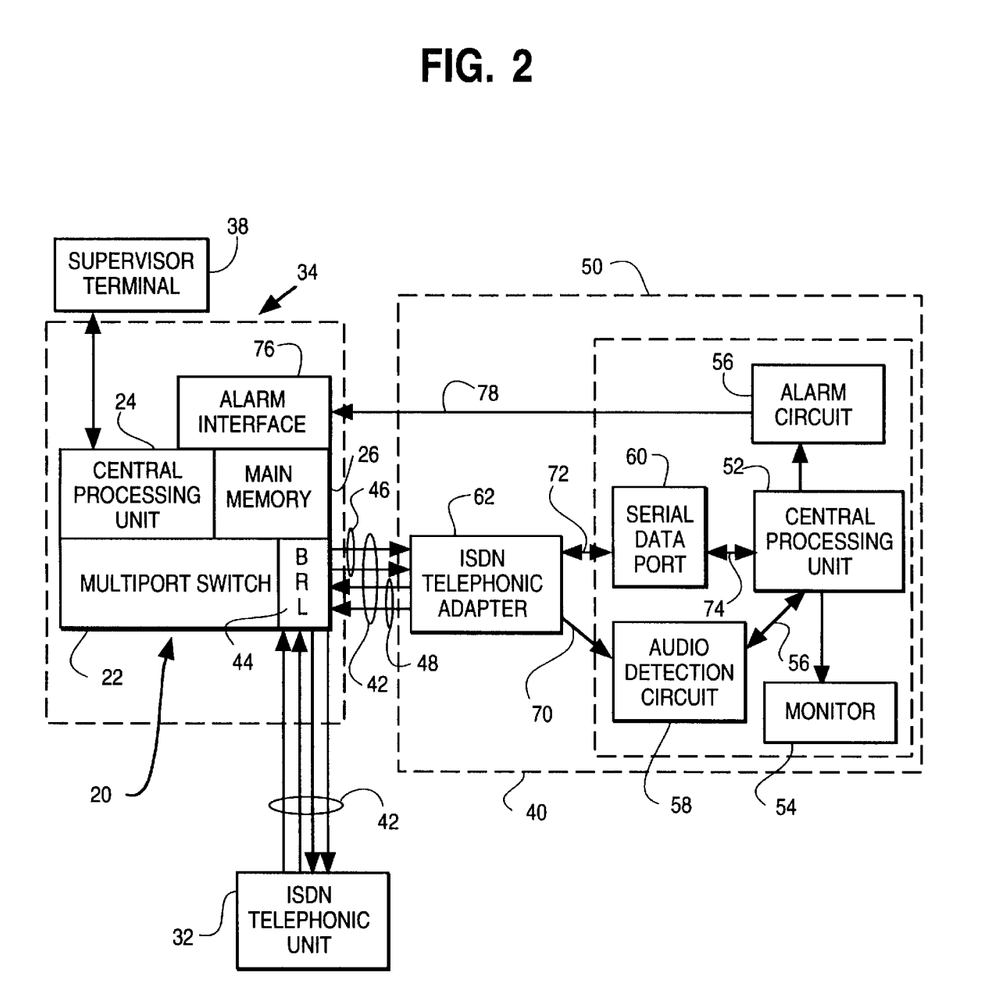
FIG. 2 is a functional block diagram of a specific embodiment of an automatic tone fault detection system, according to the present invention.

Referring now to FIG. 2, an embodiment of a tone fault detection system 50 is shown connected to the known automatic call distributor system 34. Like reference numerals are used to denote similar structures. In FIG. 2, one ISDN telephonic unit 32 is shown for purposes of clarity only. The tone fault detection system 50 includes a central processor 52 connected to a monitor 54 and to an alarm or notification circuit 56. The central processor 52 is also coupled to an audio detection circuit 58 and a serial port 60. The serial port 60 is bidirectionally coupled to a telephonic adapter 62, where the telephonic adapter supplies analog audio data to the audio detection circuit 58. Preferably, the telephonic adapter 62 is an ISDN telephonic adapter, as is known in the art. For example, the telephonic adapter 62 may be a SpectraSet Model 150 Telephonic Adapter manufactured by Rockwell International Corporation, as is known in the art.

The tone fault detection system 50 may be contained in a commercially available personal computer, such as an IBM® compatible personal computer or the like having the above-described circuit elements. Accordingly, the central processor may be, for example, an Intel 286, 386, 486, or Pentium® microprocessor. However, any suitable computer platform or microprocessor may be used. If a commercially available personal computer platform is used, the interconnection between the central processor 52, the serial port 60, the audio detection circuit 58, the telephonic adapter 62, the alarm circuit 56, and the monitor 54 may be the standard PC bus interface associated with that computer platform, as is known in the art.

The telephonic adapter 62 connects to the BRL interface 44 of the multiport switch 22 in a similar way as the ISDN telephonic unit 32 connects to the multiport switch. The four wire interface 42, which may be, for example, an ISDN "S" type BRL interface, is used to connect the telephonic adapter 62 to the multiport switch 22 of the automatic call distributor system 34. The automatic call distributor system 34 does not immediately "know" that the device connected via the four wire interface 42 is the tone fault detection system 50. When the tone fault detection system 50 connects to the automatic call distributor system 34, it "logs-in" as a supervisory console to gain specific system rights and access capabilities. This permits the tone fault detection system 50 to perform various system operations within the automatic call distributor system 34, as will be described in greater detail hereinafter.

Note that the automatic call distributor system 34 and the tone fault detection system 50 are not limited to use with only ISDN capable telephonic devices. For example, the automatic call distributor system 34 may be configured to connect to conventional or non-ISDN telephonic units. In this case, the telephonic adapter 62 of the tone fault detection system 50 may be a standard non-ISDN telephonic adapter, as is known in the art. Such a non-ISDN telephonic adapter performs the same function as the ISDN telephonic adapter 62 but does not necessarily follow ISDN based protocol and interface standards. In either case, the function of the telephonic adapter 62 is to separate voice signals from control signal. The telephonic adapter 62 receives tones and messages from a selected port of the automatic call distributor 20. The tones and messages contain audio information and control information, which when received by the telephonic adapter 62, are separated. The telephonic adapter 62 separates the digital audio data sent from the automatic call distributor 22 and converts the data into analog audio data. The analog audio data is then transmitted to the audio detection circuit 58 through a line 70. The telephonic adapter 62 receives and sends digital control and signaling data and communicates to the central processor 52 though the serial data port 60 over lines 72 and 74. The serial data port may be, for example, a standard RS-232 communication port.

In order to gain access to the automatic call distributor system 34, the tone fault detection system 50 connects to the automatic call distributor system using a password and log-in protocol, as will be described in greater detail with reference to the flowcharts of FIGS. 3A–3B. Data and handshaking signals are transmitted between the automatic call distributor system 34 and the tone fault detection system 50 through the telephonic adapter 62 and the serial data port 60.

Preferably, the audio detection circuit 58 is a commercially available audio detection circuit, such as a Soundblaster® audio card Model 32 PNP manufactured by Creative Labs Corporation, or the like. However, any suitable audio detection circuit capable of measuring the power and frequency of audio signals may be used. The audio detection circuit 58 receives analog audio signals from the telephonic adapter 62 and analyzes the power level of the signal corresponding to the tones or messages received from the automatic call distributor 20. Analysis of the signal is preferably the same regardless of whether the audio signal received is a "touch-tone" signal or a voice message. The audio detection circuit 58 determines the power level of the signal and compares the power level to a minimum level, for example, minus 10 dBm. If the power level of the audio signal is above the minimum level, indicating that the tones or messages generated by the automatic call distributor system 34 are sufficient for the customer to hear when he or she is connected to the automatic call distributor system, the test passes and the next port is tested. If the power level of the audio signal is below the minimum level, the test fails and the central processor 52 activates the alarm or notification circuit 56. The central processor 52 displays an indication of the failed port identifier on the monitor 54 so that service personnel may effect repair of the automatic call distributor system 38. The ports are continuously tested on a sequential "round-robin" basis, as will be described hereinafter. The audio detection circuit 58 is configured to be connected to a 600 ohm load, which corresponds to the impedance of a standard telephonic unit. The voltage of the signal is measured by the audio detection circuit 58 according to the known formula that power equals the square of the voltage divided by resistance. Accordingly, if R=600, the power level is easily calculated. Alternately, the audio detection circuit 58 may also determine the frequency of the audio signal and depending upon the frequency detected, may compare the power level of the signal to a predetermined power level which is dependent upon frequency. Of course, a frequency range may also be determined. In this way, for example, tones may be required to be above a first predetermined power level, while voice messages may be required to be above a second predetermined power level.

Preferably, the alarm circuit 56 includes an electromagnetic relay responsive to a signal sent by the central processor 52. The alarm circuit 56 is connected to an alarm interface circuit 76 of the automatic call distributor system 34 by a single wire 78. The input to the alarm interface 76 is preferably optically isolated. When the alarm circuit 56 is activated to indicate a fault condition, current flow between the alarm circuit and the alarm interface 76 is sensed. The automatic call distributor system 34 then displays a message on the supervisory terminal 38 indicating that a fault has occurred. In one embodiment, the automatic call distributor system 34 cannot determine the cause of the failure, that is, the particular port that has failed. The automatic call distributor 34 is only informed by the tone fault detection system 50 that a port has failed somewhere, but the exact location of the failure is not provided to the automatic call distributor. However, the port that failed is displayed on the monitor 54 of the tone fault detection system 50 so that service personnel may effect timely repair.

In another specific embodiment of the tone fault detection system 50, the identification of the failed port is additionally transmitted to the automatic call distributor system 34 by the tone fault detection system 50 via a serial line or other similar communication line (not shown). The automatic call distributor system 34 then displays the failed port identifier on the supervisory terminal 38.

Note that the novel automatic fault detection system and method is not limited to use in an automatic call distributor system and may be implemented in many types of computer-based systems, such as telephonic systems, switching systems, network control systems, industrial control systems, and virtually any computer-based device using a multi-tasking operating system.

Figure 3A:
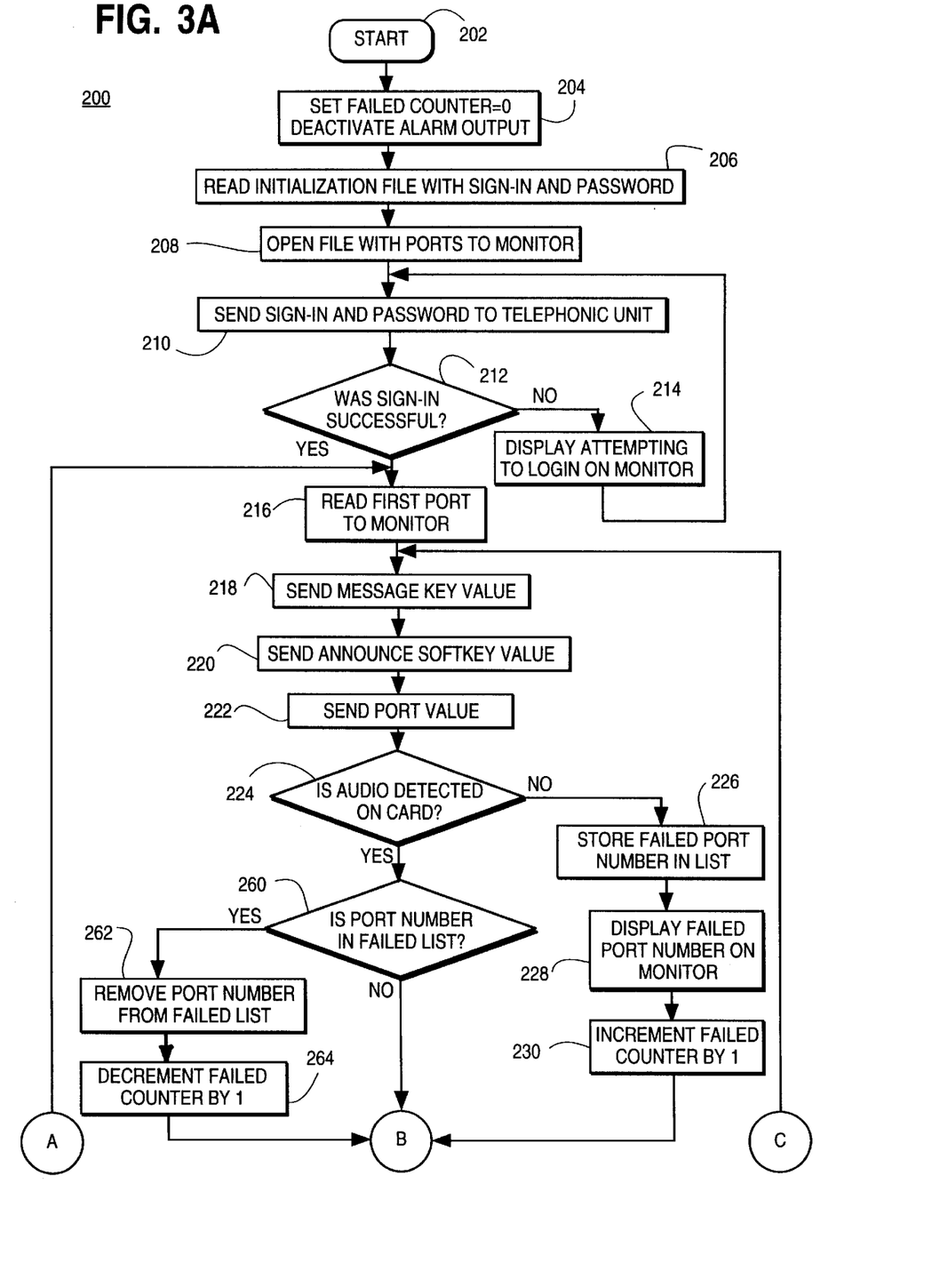
FIGS. 3A–3B are flowcharts illustrating one embodiment of an automatic tone fault detection method, according to the present invention.
Figure 3B:
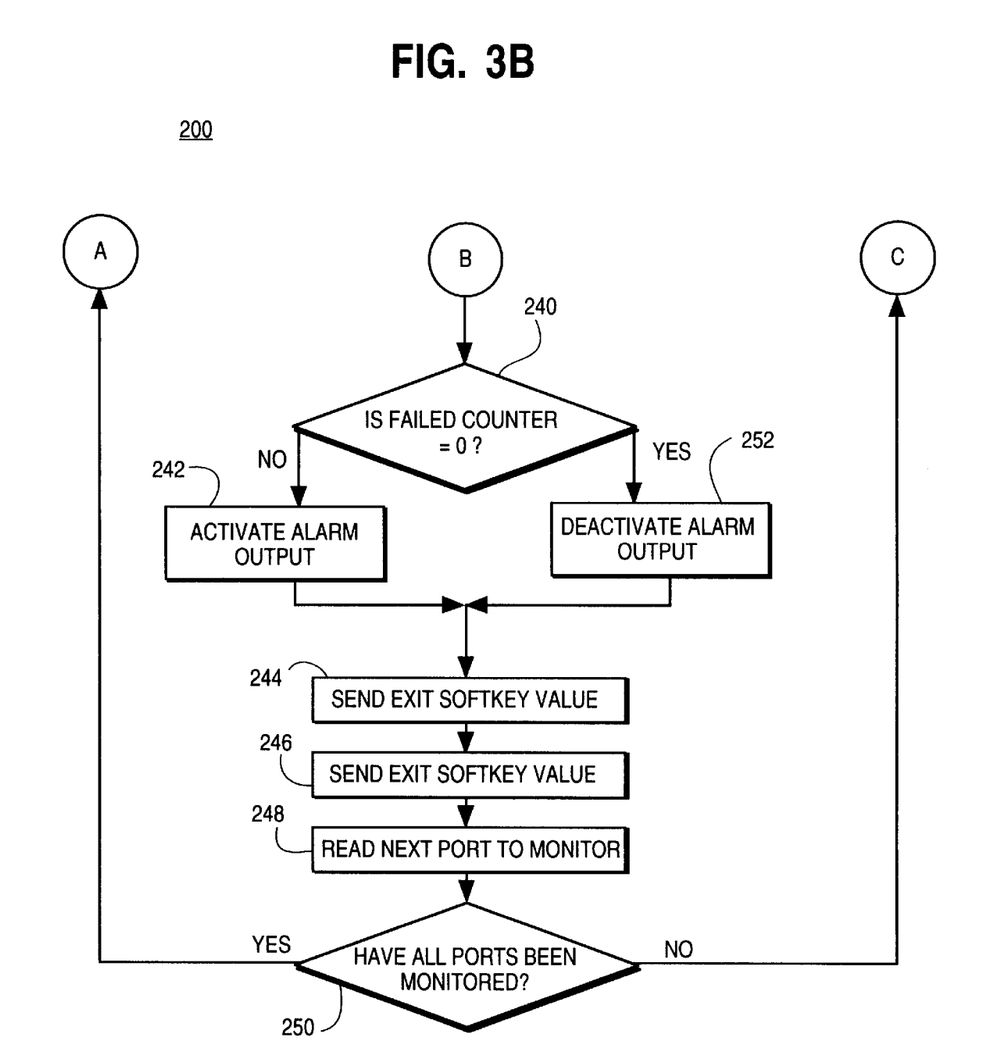

Referring now to FIGS. 3A–3B, FIGS. 3A–3B show a flowchart illustrating a specific embodiment of the logical flow of a tone fault detection program 200 controlling the central processor 52 of the tone fault detection system 50. Preferably, the software is written in "C" language complied using Release 4.0 C compiler by Microsoft Corporation. However, any suitable computer language, such as BASIC, Pascal C++, or the like may be used.

The tone fault detection program 200 begins as indicated at a step 202. Next, as shown at a step 204, a "failed-counter" is set to the value of zero and the alarm circuit 56 (FIG. 2) is deactivated. The failed-counter indicates the number of ports in the automatic call distributor system 34 (FIG. 2) that have failed. Accordingly, no failures are initially indicated.

As shown in a step 206, an initialization file is read by the central processor 52 (FIG. 2) which contains sign-in or log-in information, and a password that permits the tone fault detection system 50 to access the automatic call distributor system 34. Transmission of the log-in and password information to the automatic call distributor system 34 permits the tone fault detection system 50 to log into the automatic call distributor system and perform specific functions, such as directing that tones and messages be provided on specific ports of the automatic call distributor system 34.

Next, as illustrated in a step 208, a "ports-to-be-monitored" file is accessed that provides a list of the ports within the automatic call distributor system 34 that are to be monitored. The port numbers in the ports-to-be-monitored list correspond to the specific ports within the automatic call distributor system 34 (FIG. 2) that provide the tones and messages. These ports are the ports contained in the DAS circuit (not shown) of the automatic call distributor system 34.

As shown in a step 210, the log-in or sign-in message and the password are transmitted to the automatic call distributor system 34 (FIG. 2) via the telephonic adaptor 62 (FIG. 2). If the tone fault detection system 50 (FIG. 2) was not able to sign-in successfully, as indicated by a "no" branch of a step 212, the automatic call distributor system 34 (FIG. 2) displays a message on the supervisory terminal 38 (FIG. 2) that the tone fault detection system is attempting to log in, as illustrated in a step 214. The program then branches back to the step 210 and continues to attempt to log in. If the tone fault detection system 50 (FIG. 2) is able to successfully log in, as indicated by a "yes" branch of the step 212, then the first port to be monitored contained in the ports-to-be-monitored list is identified by its port number, as illustrated in a step 216.

Next, as illustrated in steps 218, 220, and 222, the selected port number is transmitted to the automatic call distributor system 34 (FIG. 2), preceded by transmission of two specific codes, indicated by "message key" of the step 218, and "announce softkey" of the step 220. All three codes are transmitted by the telephonic adapter 62 (FIG. 2) to the automatic call distributor system 34 (FIG. 2). Because the tone fault detection system 50 (FIG. 2) has logged into the automatic call distributor system 34 (FIG. 2) as a supervisory console, certain privileges are granted. One such privilege is that the tone fault detection system 50 (FIG. 2) may specify that the output of selected ports of the automatic call distributor system 34 (FIG. 2) be routed through the BRL interface circuit 44 (FIG. 2) so that the tones and messages may be transmitted via the four wire interface 42 (FIG. 2).

After the codes and the port number have been transmitted to the automatic call distributor system 34 (FIG. 2), the automatic call distributor provides the tones or messages on the selected port. The tones or messages are received by the telephonic adapter 62 (FIG. 2) and the audio detection circuit 58 (FIG. 2) is accessed to determine whether the audio signal received, if any, via the line 70 (FIG. 2), has an adequate power output level, as illustrated in a step 224. If the port number being monitored fails to provide an audio output level of sufficient power, as indicated by a "no" branch of the step 224, the port number is saved in a "failed-port" list, as shown in a step 226. That port number or a similar indication is then displayed on the monitor 54 (FIG. 2) to inform service personnel that a failure in a port of the automatic call distributor system 34 (FIG. 2) has occurred, as illustrated in a step 228.

To indicate that a port failure has been detected, the failed-counter is incremented by one, as shown in a step 230. Next, the failed-counter is inspected to determine whether any failures have occurred, as shown in the step 240. If the failed-counter is not equal to zero. as illustrated by a "no" branch of the step 240, the alarm circuit 56 (FIG. 2) is activated, as illustrated in a step 242.

Next two codes represented by "exit soft key" are transmitted to the automatic call distributor system 34 (FIG. 2), as illustrated in steps 244 and 246, respectively. This informs the automatic call distributor system 34 (FIG. 2) that the selected port is no longer being tested. The automatic call distributor 34 (FIG. 2) then inhibits generation of tones or messages on the selected port. The next port to be monitored in the list of ports-to-be-monitored is then read, as shown in a step 248. If all of the ports in the list of ports-to-be-monitored have now been monitored, as shown in a "yes" branch of a step 250, the program branches back to the step 216 to begin the test starting with the first port to be monitored. If all the ports have not yet been monitored, as shown by a "no" branch of the step 250, the program branches back to the step 218 to inform the automatic call distributor system 34 (FIG. 2) of the next port number to be monitored.

In the step 240, if the failed-counter is equal to zero, as shown by a "yes" branch in the step 240, the alarm circuit 56 (FIG. 2) is deactivated, as illustrated in a step 252. Because monitoring of the ports occurs continuously, port failures that are detected and displayed on the monitor 54 (FIG. 2), may be subsequently corrected by service personnel. Corrective measures include resetting or reinitializing certain portions of the automatic call distributor system 34 (Fig.2), such as DAS circuits, memory, and software routines within the automatic call distributor system. Accordingly, when all of the detected port failures have been corrected, the program indicates that no failures exist and the alarm circuit 56 (FIG. 2) is deactivated.

Referring back to the step 224, if an adequate level of audio power is detected by the audio detection circuit 58 (FIG. 2), as illustrated by a "yes" branch of the step 224, the failed-ports list is inspected to determine if the port that had just been determined to be good had previously been listed as a failed port, as shown in a step 260. If that port number is not found in the failed-port list, as shown by a "no" branch of the step 260, the program branches to the step 240 to determine if any failures currently exist. If the port that had just been tested and found to be good is listed in the failed-port list, indicating that the failure condition has been corrected, as illustrated by the "yes" branch of the step 260, that port number is removed from the failed-port list, as shown by the step 262, and the failed-counter is decremented by one, as shown in a step 264. The program then branches to the step 240 to determine if current failures exist.

In this way, the tone fault detection program 200 is continuously repeated to detect port failures in the automatic call distributor system 34 (FIG. 2) in an on-going manner. The ports listed in the ports-to-be-monitored list are continuously and sequentially tested, and failures are immediately displayed on the monitor 54 (FIG. 2). Additionally, the automatic call distributor system 34 (FIG. 2) is immediately informed of any port failure via the alarm circuit 56 (FIG. 2). Similarly, when a detected port failure has been corrected, the indication of the port failure is immediately removed.

Specific embodiments of an automatic tone fault detection system and method according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. An apparatus for detecting failure of tones and messages generated by an telephonic system, the telephonic system having a multiport switch with a plurality of ports on which the tones and messages are provided, the apparatus comprising:

a telephonic adapter configured to communicate with the telephonic system;

a central processor coupled to the telephonic adapter, the central processor configured to communicate with the telephonic system through the telephonic adapter and to log-in to the telephonic system as a supervisory console;

an audio detection circuit coupled to the telephonic adapter to receive signals representative of the tones and messages provided by a selected port of the telephonic system, the audio detection circuit configured to measure at least a power level of the received signals and to provide an indication to the central processor whether the measured power level is within a predetermined range; and an alarm circuit coupled to the central processor and responsive thereto, configured to indicate to the telephonic system that the measured power level is not within the predetermined range.

2. The apparatus according to claim 1 wherein the telephonic adapter is an ISDN telephonic adapter.

3. The apparatus according to claim 2 wherein the telephonic adapter supplies analog audio signals to the audio detection circuit and digital signals to the central processor.

4. The apparatus according to claim 1 wherein the telephonic adapter communicates with the telephonic system such that the telephonic system recognizes the apparatus as a supervisory-type device.

5. The apparatus according to claim 1 wherein the telephonic adapter is operatively coupled to the basic rate line interface device to provide bidirectional communication between the telephonic system and the telephonic adapter.

6. The apparatus according to claim 1 further including a serial communication device coupled between the central processor and the telephonic adapter.

7. The apparatus according to claim 1 wherein the central processor transmits a selected port identifier to the telephonic system to facilitate production of at least one of the tones and messages on the selected port, the at least one of the tones and messages being transmitted to the telephonic adapter by the telephonic system.

8. The apparatus according to claim 7 wherein the at least one of the tones and messages corresponding to the selected port is received by the audio detection circuit such that the power level is determined and compared to the predetermined range.

9. The apparatus according to claim 1 further including a visual display device operatively coupled to the central processor, configured to display an indication of the selected port on which a failure of at least one of the tones and messages occurred.

10. The apparatus according to claim 1 wherein an indication of the selected port on which a failure occurred is transmitted to the telephonic system.

11. The apparatus according to claim 10 wherein the telephonic system, upon receipt of the indication of the selected port on which a failure occurred, displays an indication of the failed port on a display device.

12. The apparatus according to claim 1 further including a frequency detection circuit configured to determine a frequency corresponding to the received signals.

13. The apparatus according to claim 1 further including a basic line rate interface device coupled to the multiport switch.

14. An apparatus for detecting failure of tones and messages generated by an telephonic system, the telephonic system having a multiport switch with plurality of ports on which the tones and messages are provided, the apparatus comprising:

a telephonic adapter configured to communicate with the telephonic system;

a central processor coupled to the telephonic adapter and configured to communicate with the telephonic system through the telephonic adapter and to log-in to the telephonic system as a supervisory console;

a serial communication device coupled between the central processor and the telephonic adapter;

an audio detection circuit coupled to the telephonic adapter configured to receive audio signals representative of the tones and messages provided by a selected port of the telephonic system, the audio detection circuit measuring at least a power level of the audio signals and indicating to the central processor whether the measured power level is within a predetermined range;

an alarm circuit coupled to the central processor configured to indicate to the telephonic system that the measured power level is not within the predetermined range; and a visual display device operatively coupled to the central processor configured to identify the selected port on which a failure of at least one of the tone and message occurred.

15. The apparatus according to claim 14 wherein the telephonic adapter is an ISDN telephonic adapter.

16. The apparatus according to claim 14 wherein the central processor transmits a selected port identifier to the telephonic system to facilitate production of at least one of the tones and messages on the selected port, the at least one of the tones and messages being transmitted to the telephonic adapter by the telephonic system.

17. The apparatus according to claim 14 wherein an indication of the selected port on which a failure occurred is transmitted to the telephonic system.

18. The apparatus according to claim 14 further including a frequency detection circuit configured to determine a frequency corresponding to the received audio signals.

19. The apparatus according to claim 1 further including a basic line rate interface device coupled to the multiport switch.

20. A method for detecting failure of tones and messages generated by an telephonic system having a plurality of ports on which the tones and messages are provided, the method comprising the steps of:

a. establishing communication with the telephonic system;
  b. logging-in to the telephonic system as a supervisory console:
  c. selecting a port to be tested;
  d. identifying the selected port to the telephonic system so that the telephonic system provides at least one of the tones and messages on the selected port;
  e. receiving audio signals representative of the at least one of the tones and messages;
  f. measuring a power level of the received audio signals;
  g. determining if the measured power level is within a predetermined range; and
  h. notifying the telephonic system of a failure if the measured power level is not within the predetermined range.

21. The method according to claim 20 further including the steps of selecting another port from the plurality of ports to be tested and repeating steps (b) through (g) until all ports of the plurality of ports have been tested.

22. The method according to claim 20 further including the steps of sequentially selecting a port from a list of ports to be tested and continuously repeating steps (b) through (g) to continuously test the telephonic system.

23. The method according to claim 20 further including the step providing a user with an indication of the selected port on which a failure occurred.

24. The method according to claim 20 further including the step providing the telephonic system with an indication of the selected port on which a failure occurred.

25. An apparatus for detecting failure of tones and messages generated by an telephonic system, the telephonic system having a multiport switch with a plurality of ports on which the tones and messages are provided, the apparatus comprising:

a telephonic adapter configured to communicate with the telephonic system;
  processing means coupled to the telephonic adapter, and adapted to communicate with the telephonic system through the telephonic adapter and to log-in to the telephonic system as a supervisory console;
  means for detecting audio signals representative of the tones and messages, the audio signals provided by a selected port of the telephonic system;
  the means for detecting audio signals adapted to measure at least a power level of the audio signals and to provide an indication to the processing means whether the measured power level is within a predetermined range; and
  means for informing the processing means that the measured power level is not within a predetermined range.

26. The apparatus according to claim 25 wherein the telephonic adapter supplies analog audio signals to the means for detecting audio signals and supplies digital signals to the processing means.

27. The apparatus according to claim 25 wherein the telephonic adapter communicates with the telephonic system such that the telephonic system recognizes the apparatus as a supervisory-type device.

28. The apparatus according to claim 25 wherein the telephonic adapter is operatively coupled to a basic rate line interface device to provide bidirectional communication between the telephonic system and the telephonic adapter.

29. The apparatus according to claim 25 further including a serial communication device coupled between the processing means and the telephonic adapter.

30. The apparatus according to claim 25 wherein the processing means transmits a selected port identifier to the telephonic system to facilitate production of at least one of the tones and messages on the selected port, the at least one of the tones and messages being transmitted to the telephonic adapter by the telephonic system.

31. The apparatus according to claim 30 wherein the at least one of the tones and messages corresponding to the selected port is received by the means for detecting audio signals such that the power level is determined and compared to the predetermined range.

32. The apparatus according to claim 25 wherein an indication of the selected port on which a failure occurred is transmitted to the telephonic system.

33. The apparatus according to claim 25 wherein the telephonic system, upon receipt of the indication of the selected port on which a failure occurred, displays an indication of the failed port on a display device.

34. The apparatus according to claim 25 further including a means for determining a frequency corresponding to the received signals.

* * * * *